(12) United States Patent
Pitchumani et al.

(10) Patent No.: US 11,940,875 B2
(45) Date of Patent: *Mar. 26, 2024

(54) SYSTEM, DEVICE AND METHOD FOR STORAGE DEVICE ASSISTED LOW-BANDWIDTH DATA REPAIR

(71) Applicant: Samsung Electronics Co., Ltd., Suwon-si (KR)

(72) Inventors: Rekha Pitchumani, Fairfax, VA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,216

(22) Filed: Sep. 19, 2022

(65) Prior Publication Data
US 2023/0016236 A1   Jan. 19, 2023

Related U.S. Application Data

(63) Continuation of application No. 16/932,679, filed on Jul. 17, 2020, now Pat. No. 11,449,387, which is a
(Continued)

(51) Int. Cl.
*G06F 3/06* (2006.01)
*G06F 11/10* (2006.01)
*G06F 13/28* (2006.01)

(52) U.S. Cl.
CPC ........ *G06F 11/1076* (2013.01); *G06F 3/0619* (2013.01); *G06F 3/064* (2013.01); *G06F 3/0673* (2013.01)

(58) Field of Classification Search
CPC .... G06F 11/1076; G06F 3/0619; G06F 3/064; G06F 3/0673
See application file for complete search history.

(56) References Cited

U.S. PATENT DOCUMENTS 8,751,859 B2   6/2014   Becker-Szendy et al.
9,058,122 B1   6/2015   Nesbit et al.
(Continued)

FOREIGN PATENT DOCUMENTS

CN   104035903 A   9/2014
CN   105765554 A   7/2016
(Continued)

OTHER PUBLICATIONS

Calis, Gokhan, "Coding and Maintenance Strategies for Cloud Storage: Correlated Failures, Mobility and Architecture Awareness," text; Electronic Dissertation, The University of Arizona, 2017, found via Google Scholar (url:http://arizona.openrepository.com/arizona/bitstream/10150/625607/1/azu_etd_15691_sip1_m.pdf), 164 pages.

(Continued)

*Primary Examiner* — Guy J Lamarre
(74) *Attorney, Agent, or Firm* — Renaissance IP Law Group LLP

(57) ABSTRACT

According to one general aspect, an apparatus may include a regeneration-code-aware (RCA) storage device configured to calculate at least one type of data regeneration code for data error correction. The RCA storage device may include a memory configured to store data in chunks which, in turn, comprise data blocks. The RCA storage device may include a processor configured to compute, when requested by an external host device, a data regeneration code based upon a selected number of data blocks. The RCA storage device may include an external interface configured to transmit the data regeneration code to the external host device.

20 Claims, 7 Drawing Sheets

Related U.S. Application Data continuation of application No. 16/103,907, filed on Aug. 14, 2018, now Pat. No. 10,719,397.

(60) Provisional application No. 62/682,763, filed on Jun. 8, 2018.

(56) References Cited

U.S. PATENT DOCUMENTS

| | | | |
|---|---|---|---|
| 9,223,644 | B1 | 12/2015 | Schrock et al. |
| 9,311,194 | B1 | 4/2016 | Cypher et al. |
| 9,684,560 | B2 | 6/2017 | Thatcher et al. |
| 9,697,226 | B1 | 7/2017 | Youngworth |
| 9,785,498 | B2 | 10/2017 | Misra et al. |
| 9,804,925 | B1 | 10/2017 | Carmi et al. |
| 10,055,346 | B2 | 8/2018 | Bonen |
| 10,318,384 | B2 | 6/2019 | Cypher et al. |
| 10,496,473 | B2 | 12/2019 | Das et al. |
| 10,719,397 | B2 * | 7/2020 | Pitchumani ........... G06F 3/0619 |
| 11,449,387 | B2 * | 9/2022 | Pitchumani ........... G06F 3/0673 |
| 2009/0300297 | A1 * | 12/2009 | Ikeuchi ............... G06F 13/4243 711/155 |
| 2012/0254524 | A1 | 10/2012 | Fujimoto |
| 2013/0007333 | A1 | 1/2013 | Fai et al. |
| 2013/0007562 | A1 | 1/2013 | Fai et al. |
| 2013/0297579 | A1 | 11/2013 | Andrew et al. |
| 2015/0006846 | A1 | 1/2015 | Youngworth |
| 2015/0012794 | A1 | 1/2015 | Losh et al. |
| 2015/0149857 | A1 | 5/2015 | Motwani et al. |
| 2015/0161163 | A1 | 6/2015 | Cypher et al. |
| 2015/0205664 | A1 | 7/2015 | Janik et al. |
| 2015/0220398 | A1 | 8/2015 | Schirripa et al. |
| 2015/0220429 | A1 | 8/2015 | Cypher et al. |
| 2015/0347228 | A1 | 12/2015 | Yang et al. |
| 2016/0110252 | A1 | 4/2016 | Hyun et al. |
| 2017/0097875 | A1 | 4/2017 | Jess et al. |
| 2017/0161148 | A1 | 6/2017 | Vairavanathan et al. |
| 2017/0179979 | A1 | 6/2017 | Hussain |
| 2017/0308437 | A1 | 10/2017 | Usvyatsky et al. |
| 2017/0329684 | A1 | 11/2017 | Lien et al. |
| 2018/0060169 | A1 | 3/2018 | Hussain et al. |
| 2018/0081754 | A1 | 3/2018 | Berman et al. |
| 2018/0181471 | A1 | 6/2018 | Panta et al. |
| 2019/0095296 | A1 | 3/2019 | McMurchie et al. |
| 2022/0029803 | A1 * | 1/2022 | Vijayanarayanan ......... H04L 9/0643 |

FOREIGN PATENT DOCUMENTS

| | | |
|---|---|---|
| KR | 101609510 B1 | 4/2016 |
| KR | 20170097625 A | 8/2017 |
| KR | 20170129703 A | 11/2017 |
| TW | 201201017 A | 1/2012 |
| WO | 2017041233 A1 | 3/2017 |
| WO | 2017065628 A1 | 4/2017 |

OTHER PUBLICATIONS

Corrected Notice of Allowability for U.S. Appl. No. 16/932,679, dated Aug. 22, 2022.

Corrected Notice of Allowability for U.S. Appl. No. 16/932,679, dated Jul. 14, 2022.

Fu, Y., et al., "Reconsidering Single Disk Failure Recovery for Erasure Coded Storage Systems: Optimizing Load Balancing in Stack-Level," IEEE Transactions on Parallel and Distributed Systems, vol. 27, No. 5, May 2016, pp. 1457-1469.

Notice of Allowance for U.S. Appl. No. 16/103,907, dated Mar. 17, 2020.

Notice of Allowance for U.S. Appl. No. 16/932,679, dated Apr. 8, 2022.

Office Action for U.S. Appl. No. 16/103,907, dated Nov. 26, 2019.

Office Action for U.S. Appl. No. 16/932,679, dated Dec. 29, 2021.

Rashmi, K.V., et al., "Regenerating Codes for Errors and Erasures in Distributed Storage," IEEE International Symposium on Information Theory (ISIT), 2012, 5 pages.

* cited by examiner

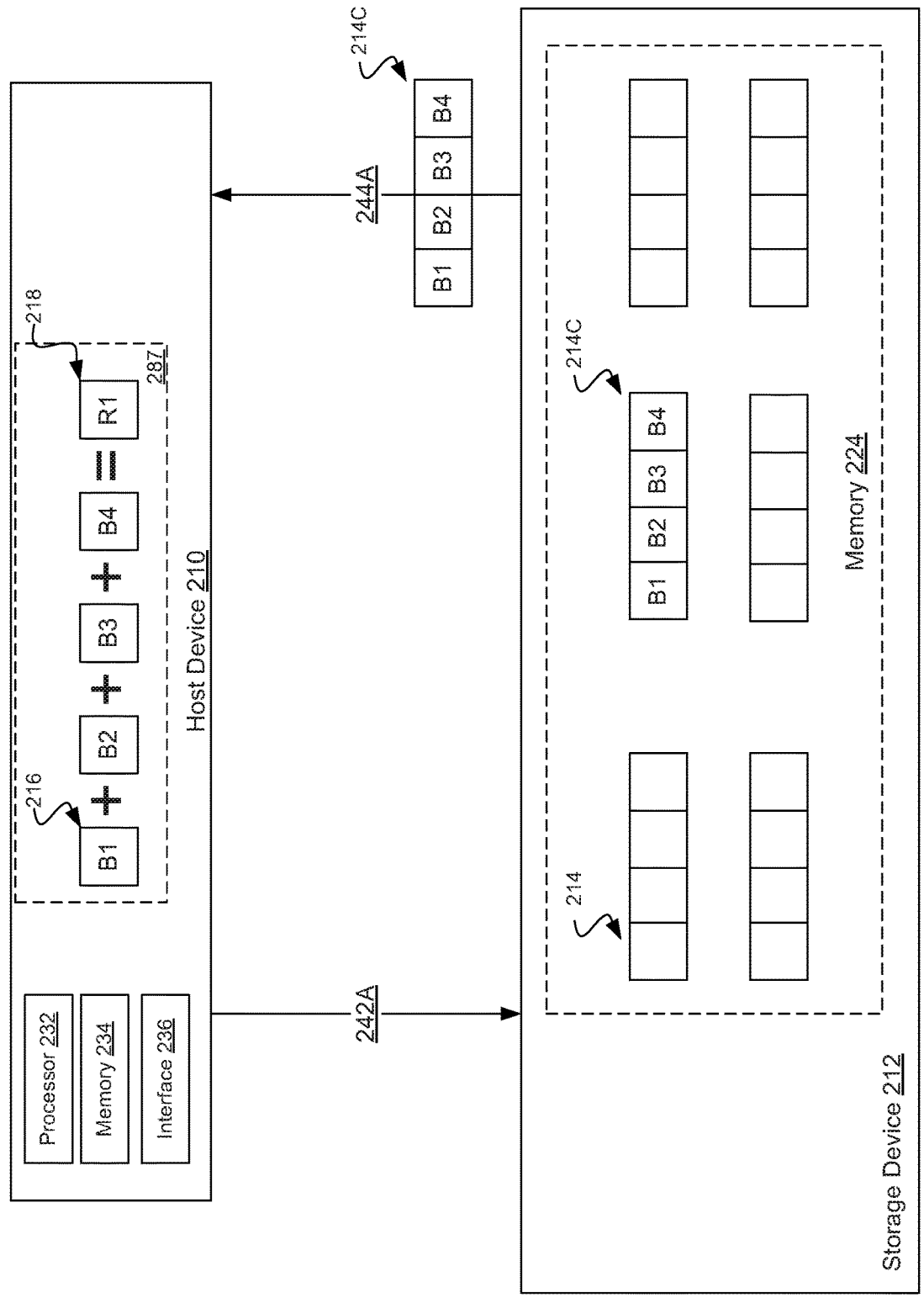

SYSTEM, DEVICE AND METHOD FOR STORAGE DEVICE ASSISTED LOW-BANDWIDTH DATA REPAIR

CROSS-REFERENCE TO RELATED APPLICATION

This application is a continuation of U.S. patent application Ser. No. 16/932,679, filed on Jul. 17, 2020, which is a continuation of U.S. patent application Ser. No. 16/103,907, filed on Aug. 14, 2018, now issued as U.S. Pat. No. 10,719,397, which claims priority under 35 U.S.C. § 119 to U.S. Provisional Patent Application Ser. No. 62/682,763, filed on Jun. 8, 2018. These earlier filed applications are hereby incorporated by reference.

TECHNICAL FIELD

This description relates to data storage, and more specifically to a system, device and/or method for storage device assisted low-bandwidth data repair.

BACKGROUND

In coding theory, an erasure code is a forward error correction (FEC) code under the assumption of bit erasures (rather than bit errors), which transforms a message of k symbols into a longer message (code word) with n symbols such that the original message can be recovered from a subset of the n symbols. The fraction $r=k/n$ is called the code rate. The fraction $k'/k$, where $k'$ denotes the number of symbols required for recovery, is called reception efficiency.

Regenerating codes address the issue of rebuilding (also called repairing) lost encoded fragments from existing encoded fragments. In more detail, regenerating codes' are a class of codes that aim to reduce the amount of download during repair, while retaining the storage efficiency of traditional maximum distance separable (MDS) code. This issue occurs in distributed storage systems where communication to maintain encoded redundancy is a problem.

A distributed storage system is generally is a computer network where information is stored on more than one node or device, often in a replicated fashion. It is often used to refer to either a distributed database where users store information on a number of nodes, or a computer network in which users store information on a number of peer network nodes. Distributed storage systems typically use an error detection and correction technique. Some distributed storage system use forward error correction techniques to recover the original file, chunk, or blob when parts of that file are damaged or unavailable. Others try again to download that file from a different mirror.

SUMMARY

According to one general aspect, an apparatus may include a regeneration-code-aware (RCA) storage device configured to calculate at least one type of data regeneration code for data error correction. The RCA storage device may include a memory configured to store data in chunks which, in turn, comprise data blocks. The RCA storage device may include a processor configured to compute, when requested by an external host device, a data regeneration code based upon a selected number of data blocks. The RCA storage device may include an external interface configured to transmit the data regeneration code to the external host device.

According to another general aspect, a system may include a host device and a distributed storage system. The host device may be configured to store data, as a plurality of chunks, amongst a distributed storage system, detect when at least one chunk is associated with an error, and in response to the error, reconstruct, via a data regeneration technique, the chunk associated with the error based, at least in part, upon the plurality of chunks of the data. The distributed storage system may include a plurality of storage devices, wherein each storage device is configured to store at least a respective chunk of the data, and wherein the plurality of storage devices includes at least one regeneration-code-aware (RCA) storage device, wherein each RCA storage device is configured to internally calculate at least one type of data regeneration code.

According to another general aspect, a system may include a host device configured to: store data, in a plurality of chunks, amongst a storage system, detect when at least one chunk is associated with an error, and in response to the error, correct, via a data regeneration technique, the error based, at least in part, upon the plurality of chunks of the data. The system may include the storage system that includes a plurality of storage devices, wherein each storage device is configured to store at least a respective chunk of the data, and wherein the plurality of storage devices includes at least one regeneration-code-aware (RCA) storage device, wherein each RCA storage device is configured to internally calculate at least one type of data regeneration code The RCA storage device may include a memory configured to store data in chunks, wherein each chunk comprises data blocks, a processor configured to compute, when requested by the host device, a data regeneration code based upon a selected number of data blocks, a code memory configured to store a plurality of sets of instructions, wherein each set of instructions generates a different data regeneration code, and an external interface configured to transmit the data regeneration code to the host device.

The details of one or more implementations are set forth in the accompanying drawings and the description below. Other features will be apparent from the description and drawings, and from the claims.

A system and/or method for data storage, and more specifically to storage device assisted low-bandwidth data repair, substantially as shown in and/or described in connection with at least one of the figures, as set forth more completely in the claims.

BRIEF DESCRIPTION OF THE DRAWINGS

FIG. 2A is a block diagram of an example embodiment of a system in accordance with the disclosed subject matter.

Like reference symbols in the various drawings indicate like elements.

DETAILED DESCRIPTION

Figure 1:
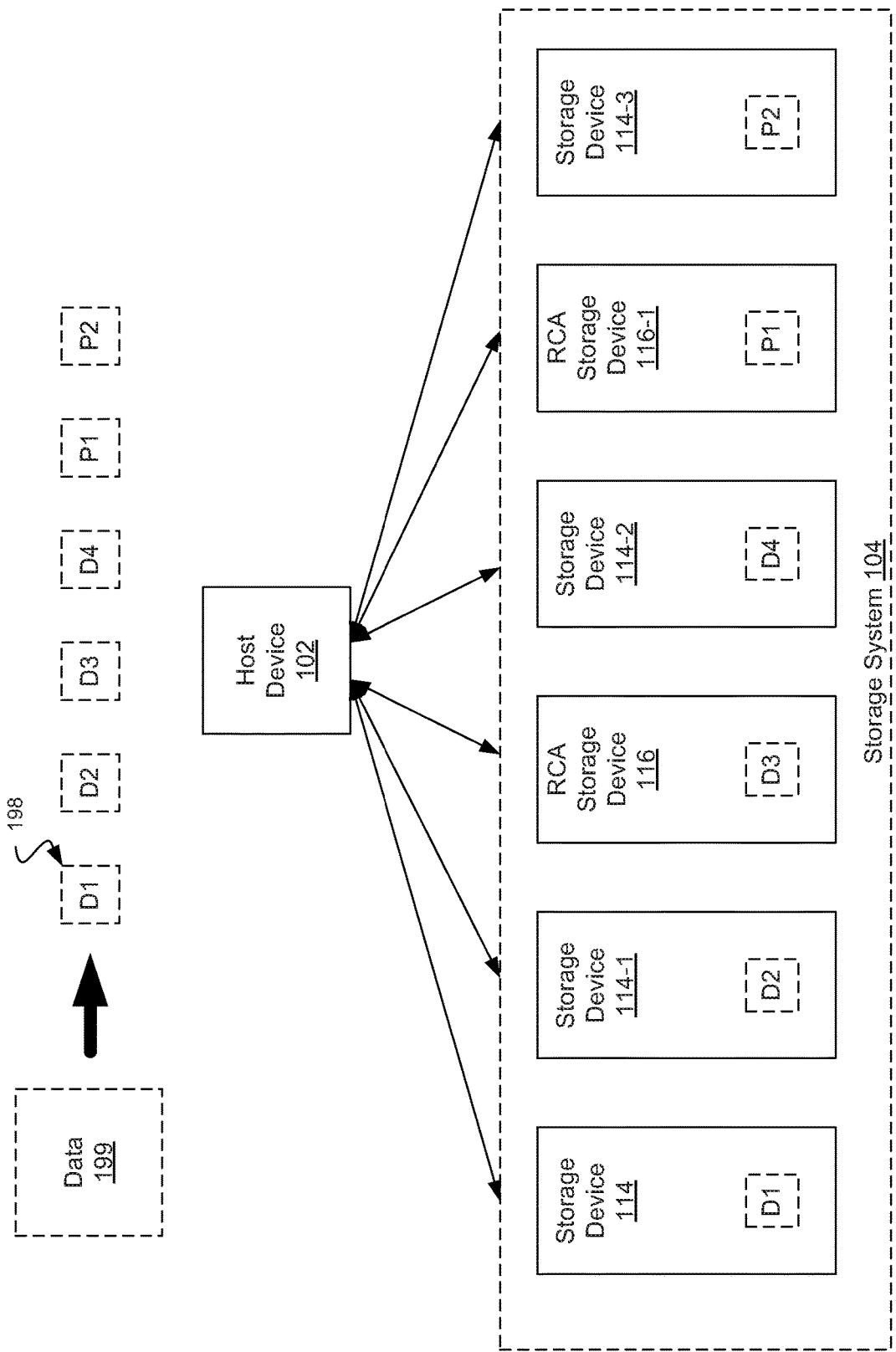
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

Likewise, electrical terms, such as "high" "low", "pull up", "pull down", "1", "0" and the like, may be used herein for ease of description to describe a voltage level or current relative to other voltage levels or to another element(s) or feature(s) as illustrated in the figures. It will be understood that the electrical relative terms are intended to encompass different reference voltages of the device in use or operation in addition to the voltages or currents depicted in the figures. For example, if the device or signals in the figures are inverted or use other reference voltages, currents, or charges, elements described as "high" or "pulled up" would then be "low" or "pulled down" compared to the new reference voltage or current. Thus, the exemplary term "high" may encompass both a relatively low or high voltage or current. The device may be otherwise based upon different electrical frames of reference and the electrical relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In the illustrated embodiment, the system 100 may include a distributed storage system 104 that stores data across a plurality of nodes or storage devices.

Distributed storage systems are often used to provide large-scale reliability storage. Often this is accomplished by spreading redundancy or error correction (e.g., parity) across a large number of nodes or storage devices. However, when a node or storage device goes off-line (e.g., due to a network error, hardware failure, etc.) the data become suspect as possible corrupt, or at least having a reduced level of redundancy. The more distributed a storage system is the more frequently this occurs.

A number of techniques may be employed to protect against such an occurrence (e.g., mirroring, Reed-Solomon encoding), but the disclosed subject matter is focused on regeneration encoding. In such an embodiment, the missing piece of data (a chunk) is regenerated or reconstructed using a formula based upon the remaining pieces of data.

In the illustrated embodiment, the system 100 may include one or more host devices 102 configured to manage the distributed storage system 104. The host device 102 may include a computing device (e.g., computer, server, virtual machine) that reads and writes to and from the storage system 104. When an error (e.g., a missing chunk of data) occurs, the host device 102 is generally responsible for detecting and, if possible, repairing the error.

In the illustrated embodiment, each data set 199 may be broken down or fragmented by the host device 102 into a plurality of smaller pieces of data or chunks 198. In the illustrated embodiment, the data 199 is divided into chunks 198 D1, D2, D3, and D4. Further, in various embodiments, the host device 102 may apply some form of redundancy to the data chunks 198, such as parity chunks P1 and P2 (also numbered 198 as they are also chunks).

In the parlance of the art, the number of original data chunks 198 (D1, D2, D3, and D4) are described as the variable K or k. Likewise, the number of redundant data chunks 198 (P1 and P2) are described as the variable R or r. Such that the total number of chunks 198 is K+R. In the illustrated embodiment, K equal 4, R equals 2, and K+R equals 6; although, it is understood that the above is merely an illustrative example to which the disclosed subject matter is not limited.

In the illustrated embodiment, the host device 102 stores each of these chunks 198 (both original and redundant) on respective nodes or storage devices of the storage system 104.

In the illustrated embodiment, the storage device 114 stores chunk 198 D1, the storage device 114-1 stores chunk 198 D2, the storage device 116 stores chunk 198 D3, the storage device 114-2 stores chunk 198 D$, the storage device 116-1 stores chunk 198 P1, and the storage device 114-3 stores chunk 198 P2. In various embodiments, the number of storage devices 114/116 may not equal the number of chunks 198.

In various embodiments, a chunk 198 may go missing (e.g., network or hardware failure) or may otherwise be associated with an error. In the illustrated embodiment, let us say chunk 198 D3 (and storage device 116) suddenly become unavailable. The host device 102 upon detecting the error, may attempt to recreate the chunk 198 D3 or otherwise correct the error.

In such an embodiment, if one chunk fails (e.g., chunk 198 D3), and there were K (e.g., 4) total chunks in the original data 199, at-least K (e.g., 4) nodes or storage devices 114/116 have to send information to the host device 102 to recover of the failed chunk (e.g., chunk 198 D3). Note, these K (e.g., 4) chunks may come from any of the K+R (e.g., 6) chunks. For example, chunks 198 D1, D2, D4, and P1 may be used to recreate chunk 198 D3.

Regeneration codes reduces the repair bandwidth by sending less than a full chunk size information from D nodes, where typically D>K. In other words, by use of a clever formula, the host device 102 may be able to recreate the missing chunk 198 D3, by using, not the full chunks 198 D1, D2, D4, and P1, but by using only a part of the 198 D1, D2, D4, P1, and P2. A regeneration code generally takes information from more storage device 114/116, but it takes less information from each storage device 114/116 than a non-regenerative code would.

For example, if 6 chunks of data were used (K=6) and 6 chunks of redundancy were used (R=6 and K+R=12) and each chunk was 16 MB in size, the standard Reed-Solomon (RS) error correction encoding scheme would require that 6 (K) 16 MB chunks be sent to the host device or 96 MB of data be transmitted to correct a missing 16 MB chunk. Conversely, if a regenerative technique was used, portions of all 12 (K+R or D, in this case) chunks would be read, but that since only a portion of each chunk was used (e.g., 2.7 MB) the total amount transmitted to the host device may be lower (e.g., 29.7 MB).

Often regeneration codes have a storage and bandwidth tradeoff. in various embodiments, In general, there are two classes or groups of regenerative codes. If storage overhead is minimal, they are called Minimum Storage Regeneration (MSR) codes. If repair bandwidth is minimal for added storage overhead, they are called Minimum Bandwidth Regeneration (MBR) codes. Within these broad categories, various specific techniques or formulas may be employed to perform the regenerative codes. It is understood that the above are merely a few illustrative examples to which the disclosed subject matter is not limited.

Returning to FIG. 1, In the illustrated embodiment, the storage system 1-4 may include a plurality of storage devices 114/116. Each storage device 114/116 may be configured to store data, in chunks or otherwise. In the illustrated embodiment, the storage devices 114 may be relatively traditional storage devices, such as hard drives, solid state drives, or even volatile memories.

However, in the illustrated embodiment, the storage system 104 may also include regeneration-code-aware (RCA) storage devices 116. In such an embodiment, unlike traditional or non-RCA storage devices 114 the RCA storage devices 116 may be configured to and include components that allow them to aid in the calculation of a data regeneration code. As discussed in more detail later, the host device 102 may be able to dynamically offload some of the computing of the data regeneration code to the RCA storage device 116. In various embodiments, this may reduce the amount of messages sent back-and-forth between the host device 102 and storage system 104, the amount of data transferred between the host device 102 and the storage system 104, and/or the computing load on the host device 102. It is understood that the above are merely a few illustrative examples to which the disclosed subject matter is not limited.

In various embodiments, the RCA storage devices 116 may be programmable, such that the host device 102 may be able to update them with the latest or a desired regeneration code formula or technique. In such an embodiment, the RCA storage devices 116 may be able to store multiple regeneration techniques and have one of them be dynamically or semi-statically selected by the host device 102. In such an embodiment, the host device 102 may select which if the regeneration techniques should be employed at a given moment.

In various embodiments, the storage system 104 may be distributed. In such an embodiment, the storage devices 114/116 may be physically remote from each other and communicate via a network protocol. In another embodiment, storage devices 114/116 may be relatively localized (e.g., in a server farm or the same building) but still communicate via a network protocol. In yet another embodiment, the storage system 104 may not be distributed. In such an embodiment, the disclosed subject matter may be employed for local device (e.g., same machine) that does not use a network protocol (e.g., USB, SATA). It is understood that the above are merely a few illustrative examples to which the disclosed subject matter is not limited.

In various embodiments, the regeneration-code-aware (RCA) storage device 116 may include the capability to calculate different types or versions of regeneration codes. In such an embodiment, the desired type or version of regeneration code may be chosen dynamically by the host device 102. In some embodiments, the RCA storage deice 116 may be capable of splitting data into smaller blocks or packets, calculating an erasure code or portion thereof, processing data chunk(s) for repair of another failed chunk, and so on.

In various embodiments, a communications protocol may exist between the host device 102 and the RCA storage device 116 to implement data reliability using any regeneration codes or techniques. In such an embodiment, the protocol may allow for selecting a regeneration technique, passing inputs, directing the operation of the desire technique, and retrieving any outputs. In some embodiments, the protocol may define host behavior when it works in a mixed environment containing both RCA and non-RCA storage devices 116/114 and how to interact with both. In various embodiments, the host system 102 may use the protocol to setup an RCA storage device 116, encode/read/write user data and to offload the computation during data repair, to reduce the data traffic and accelerate computation and rebuild the original data using the capabilities of the RCA storage device 116.

FIG. 2A is a block diagram of an example embodiment of a system 201 in accordance with the disclosed subject matter. In the illustrated embodiment, the system 201 shows an interaction between the host device 210 and a storage device 212 to compute a first kind (Type 1) regeneration code. In various embodiments, the system 201 may be employed for traditional or non-RCA storage devices, and even for RCA storage devices if their RCA functions are not employed.

In the illustrated embodiment, the system 201 may include a host device 210 and a storage device 212. In such an embodiment, the host device 210 may include a processor 232 to execute instructions and perform computations, a memory 234 to store, at least temporarily data or pieces thereof, and an interface 236 to communicate with the storage device 212 or more generally the storage system (not shown). In such an embodiment, the storage device 212 may include a memory 224 configured to store data. In various embodiments, this memory 224 may be non-volatile or volatile.

In the illustrated embodiment, the chunks 214 are sub-divided into blocks 216. In such an embodiment, the host device may take the blocks 216 from one or more chunks 214 stored on the storage device 212 (and from K−1 chunks stored on other storage devices) and compute a regeneration code 218 (R1).

In such a regeneration code technique (Type 1), blocks 216 are composed of smaller packets (not shown). For each node or storage device 212, the host device 210 calculates, using various packets, a parity packet or regeneration code 218. Each storage device's respective regeneration code 218 is used to reconstruct the missing or errored chunk. In general, for Type 1 regeneration code techniques the computation is linear and depends on the chunk that failed. The amount of data sent back depends on the sub-packetization level and the function.

In the illustrated embodiment, once the host device 210 detects an error it may transmit a data read request or command 242A to the storage device 212. The data read command 242A may include which chunk 214 is to be read (e.g., chunk 214C). The storage device 212 then transmit the desired chunk 214 to the host device 210, via the data read response or message 244A. In various embodiments, this may all be done using a traditional host-to-storage device 212 protocol (e.g., SATA).

Upon receipt of the desired chunk 214C, by the interface 236 the host device 210 may store the chunk 214C or blocks 216 in the memory 234. The processor 232 may then perform the desired regeneration code technique 287. While the regeneration code technique 287 is illustrated as a simple addition or Boolean XORing, is understood that the above are merely a few illustrative examples to which the disclosed subject matter is not limited. As described above, in various embodiments, this may include sub-dividing the blocks 216 into smaller packets. The regeneration code technique 287 may compute or generate the regeneration code 218 (R1) which is then, with the regeneration codes associated with other chunks or storage devices, may be used to reconstruct or repair the errored chunk.

Figure 2B:
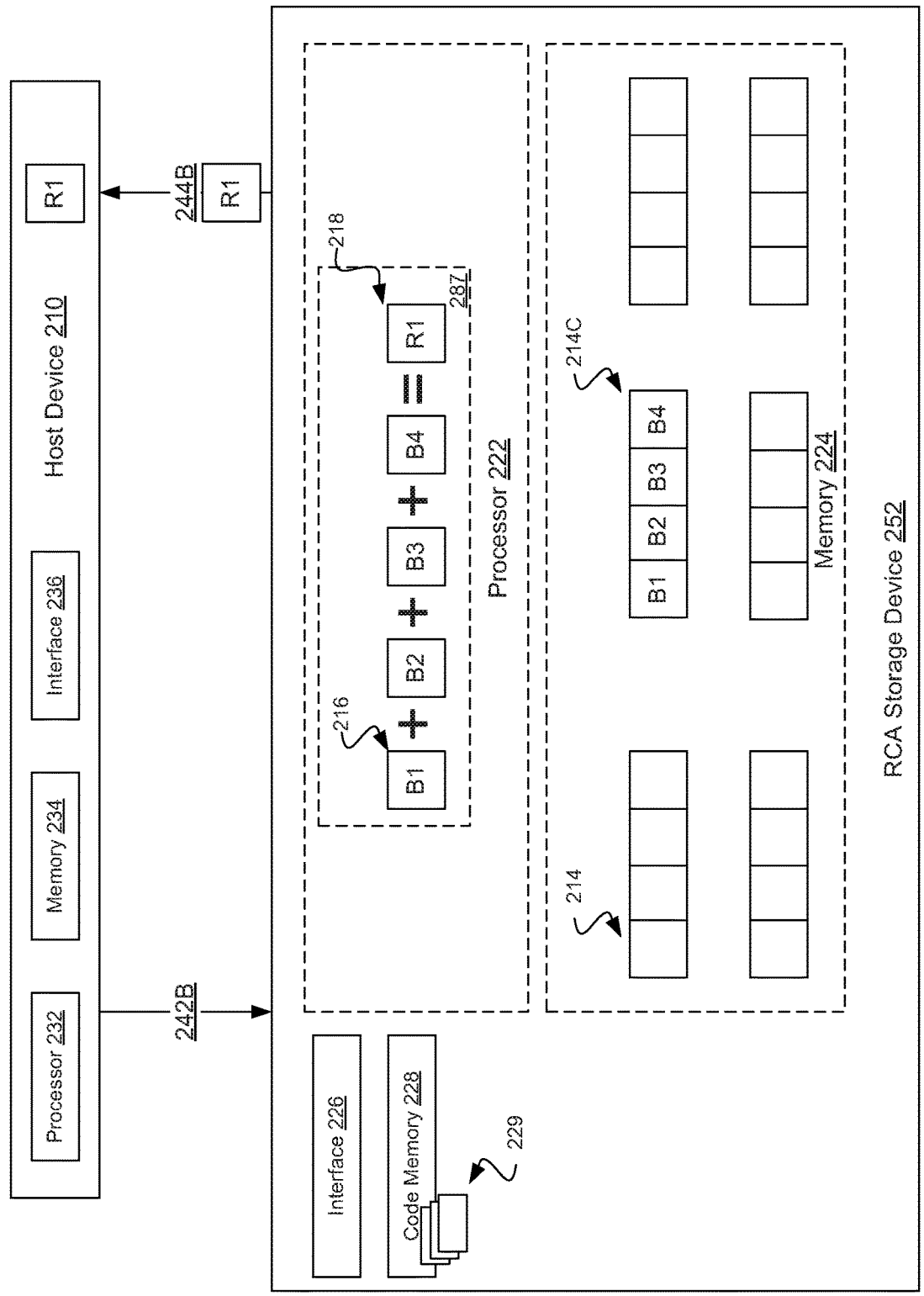
FIG. 2B is a block diagram of an example embodiment of a system in accordance with the disclosed subject matter.

FIG. 2B is a block diagram of an example embodiment of a system 203 in accordance with the disclosed subject matter. In the illustrated embodiment, the system 203 shows an interaction between the host device 210 and an RCA storage device 252 to compute a first kind (Type 1) regeneration code. In various embodiments, the system 203 may only be employed RCA storage devices and not for a non-RCA storage device.

In the illustrated embodiment, the system 201 may include a host device 210 and an RCA storage device 252. In such an embodiment, the host device 210 may include a processor 232 to execute instructions and perform computations, a memory 234 to store, at least temporarily data or pieces thereof, and an interface 236 to communicate with the storage device 212 or more generally the storage system (not shown).

In such an embodiment, the RCA storage device 252 may include a memory 224 configured to store data. In various embodiments, this memory 224 may be non-volatile or volatile. Further, in various embodiments, the RCA storage device 252 may include a processor 222 configured to compute, when requested by the host device 210 (which is generally external to the storage devices), a data regeneration code 218 based upon a selected number of data blocks 216. In various embodiments, the processor 222 may include a programmable gate array (e.g., FGPA), a graphic processor unit (GPU), a general purpose processor (e.g., CPU), a controller processor, or a system-on-a-chip (SoC). It is understood that the above are merely a few illustrative examples to which the disclosed subject matter is not limited. The RCA storage device 252 may include a code memory 228 configured to store a plurality of sets of instructions 229, wherein each set of instructions 229 generate a different data regeneration code or instructions on how to perform a different regeneration code technique. In various embodiments, the set of instructions 229 may be pre-configured into the storage device 252 or dynamically added/adjusted during run time (e.g., by the host device 210), or a combination thereof. The RCA storage device 252 may include an external interface 226 configured to communicate with at least the host device 210.

In the illustrated embodiment, the host device 210 may determine if the storage device 252 is capable of internally computing a data regeneration code or, in general, is an RCA storage device. If so, the host device 210 may determine if the RCA storage device 252 may perform the desired regeneration code technique or if it may be programmed to do so (via the code memory 228). If not, the technique shown in FIG. 2A may be employed.

If the RCA storage device 252 is capable of performing the desired regeneration code technique, the host device 210 may issue a Read for Repair command 242B. In various embodiments, the Read for Repair command 242B may include or indicate one or more of the following: an indication of the desired regeneration or repair technique, the desired packet or block size, any parameters for the desired regeneration or repair technique, the data or chunk address, and the failed chunk number. It is understood that the above are merely a few illustrative examples to which the disclosed subject matter is not limited.

In response to the command 242B, the processor 222 may retrieve the desired blocks 216 or chunk 214C. The processor 222 may also retrieve the set of instructions 229 associated with the desired regeneration or repair technique. The processor 222 may perform the desired regeneration technique 287 and compute the data regeneration code (DRC) 218 (R1).

The RCA storage device 252 may then transmit (message 244B), via the interface 226, the data regeneration code 218 (R1) to the host device 210. In such an embodiment, the data regeneration code 218 (R1) may have a smaller size or consume less bandwidth than the data transmitted via message 244A of FIG. 2A.

In the illustrated embodiment, the messages 242B and 244B may require a different protocol than that used for messages 242A and 244A. While the messages 242A and 244A may be allowed by a traditional storage device protocol, the messages 242B and 244B may require additional and different information and hence a new messaging protocol or at least new commands.

In the illustrated embodiment, the host device 210 may then use the data regeneration code 218 (R1), along with any additional data regeneration codes provided by other RCA storage devices (not shown) or generated by the host device 210 itself, to recreate the errored chunk of data.

Figure 2C:
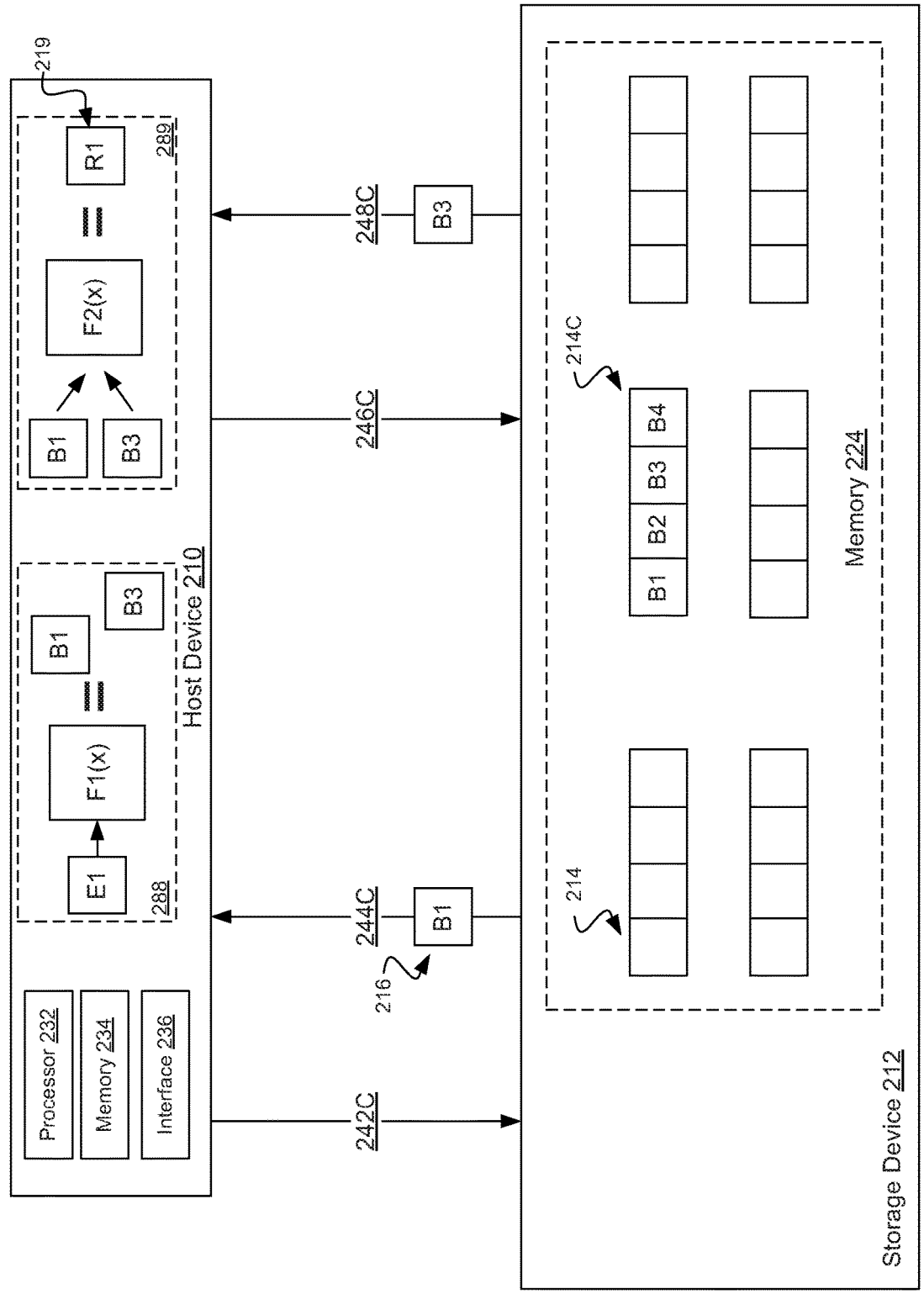
FIG. 2C is a block diagram of an example embodiment of a system in accordance with the disclosed subject matter.

FIG. 2C is a block diagram of an example embodiment of a system 205 in accordance with the disclosed subject matter. In the illustrated embodiment, the system 205 shows an interaction between the host device 210 and a storage device 212 to compute a second kind (Type 2) regeneration code. In various embodiments, the system 205 may be employed for traditional or non-RCA storage devices, and even for RCA storage devices if their RCA functions are not employed.

In the illustrated embodiment, the system 205 may include the host device 210 and storage device 212. Both the host device 210 and storage device 212 may include the components illustrated and described above.

In such a regeneration code technique (Type 2), data regeneration codes are computed such that fewer packets (not shown) or blocks 216 have to be read. However, this often means that the desired blocks 216 or packets are known in full ahead of time but are requested piecemeal as the computation progresses. While this kind of regeneration technique reduces both the network bandwidth and data read theoretically, it converts one large read into multiple smaller reads, which is not good for performance.

In the illustrated embodiment, the host device, using portion 288 of the desired regeneration technique computes that if block E1 is associated with an error, then blocks B1 and B3 (or packets thereof) will be needed to fix the errored block E1. In such an embodiment, once the host device 210 detects that block B1 is needed it may transmit a data read request or command 242C to the storage device 212. The data read command 242C may indicate which block 216 is to be read (e.g., block B1). The storage device 212 then transmits the desired block 216 B1 to the host device 210, via the data read response or message 244C. In various embodiments, this may all be done using a traditional host-to-storage device 212 protocol (e.g., SATA).

In such an embodiment, once the host device 210 detects that block B3 is needed it may transmit a data read request or command 246C to the storage device 212. This is typically done as a second data request, separate from the one requesting block B1. The data read command 246C may indicate which block 216 is to be read (e.g., now block B3). The storage device 212 then transmits the desired block 216 B3 to the host device 210, via the data read response or message 248C. In various embodiments, this may all be done using a traditional host-to-storage device 212 protocol (e.g., SATA).

Upon receipt of the desired blocks 216, by the interface 236 the host device 210 may store the blocks 216 in the memory 234. The processor 232 may then perform the desired regeneration code technique (shown by the portion 289). The regeneration code technique (or portion 289) may compute or generate the regeneration code 219 (R1) which is then, with the regeneration codes associated with other chunks or storage devices, may be used to reconstruct or repair the errored chunk.

Figure 2D:
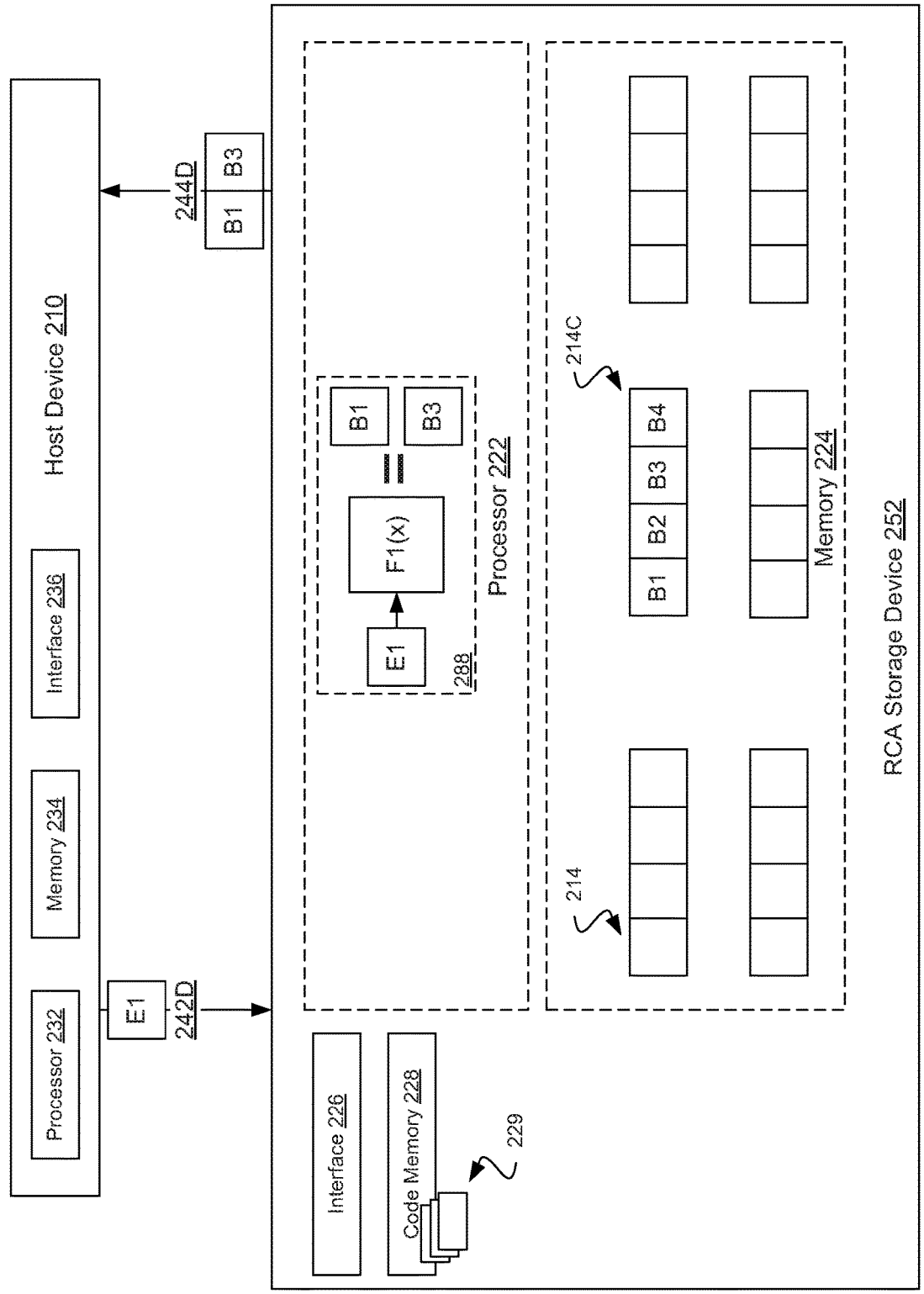
FIG. 2D is a block diagram of an example embodiment of a system in accordance with the disclosed subject matter.

FIG. 2D is a block diagram of an example embodiment of a system 207 in accordance with the disclosed subject matter. In the illustrated embodiment, the system 207 shows an interaction between the host device 210 and an RCA storage device 252 to compute a first kind (Type 2) of regeneration code. In various embodiments, the system 207 may only be employed RCA storage devices and not for a non-RCA storage device.

In the illustrated embodiment, the system 207 may include the host device 210 and storage device 252. Both the host device 210 and storage device 252 may include the components illustrated and described above.

In the illustrated embodiment, the host device 210 may determine if the storage device 252 is capable of internally computing a data regeneration code or, in general, is an RCA storage device. If so, the host device 210 may determine if the RCA storage device 252 may perform the desired regeneration code technique or if it may be programmed to do so (via the code memory 228). If not, the technique shown in FIG. 2C may be employed.

If the RCA storage device 252 is capable of performing the desired regeneration code technique, the host device 210 may issue a Read for Repair command 242D. In various embodiments, the Read for Repair command 242D may include or indicate one or more of the following: an indication of the desired regeneration or repair technique, the desired packet or block size, any parameters for the desired regeneration or repair technique, the data or chunk address, and the failed chunk number (e.g., block E1). It is understood that the above are merely a few illustrative examples to which the disclosed subject matter is not limited.

In response to the command 242B, the processor 222 may retrieve the set of instructions 229 associated with the desired regeneration or repair technique. The processor 222 may perform the desired regeneration technique or portion 288 thereof. In such an embodiment, the processor 22 may compute that the desired blocks are B1 and B3. In such an embodiment, these bocks B1 and B2 may be included in the data regeneration code computed by the RCA storage device 252. In such an embodiment, these blocks may be considered only part of the response to the Read for Repair command 242D.

The RCA storage device 252 may then transmit (message 244D), via the interface 226, the desired blocks B1 and B3 to the host device 210. In such an embodiment, the data regeneration code or the desired blocks B1 and B3 may have a smaller size or consume less bandwidth or at least include less message and hence less overhead than the data transmitted via messages 244C and 248C of FIG. 2C.

In the illustrated embodiment, the messages 242D and 244D may require a different protocol than that used for messages 242C, 244C, 246C, and 248C. While the messages 242C, 244C, 246C, and 248C may be allowed by a traditional storage device protocol, the messages 242D and 244D may require additional and different information and hence a new messaging protocol or at least new commands.

In the illustrated embodiment, the host device 210 may then use the data regeneration code, or blocks B1 and B3, along with any additional data regeneration codes or data provided by other RCA storage devices (not shown) or generated by the host device 210 itself, to recreate the errored data (E1).

Figure 3:
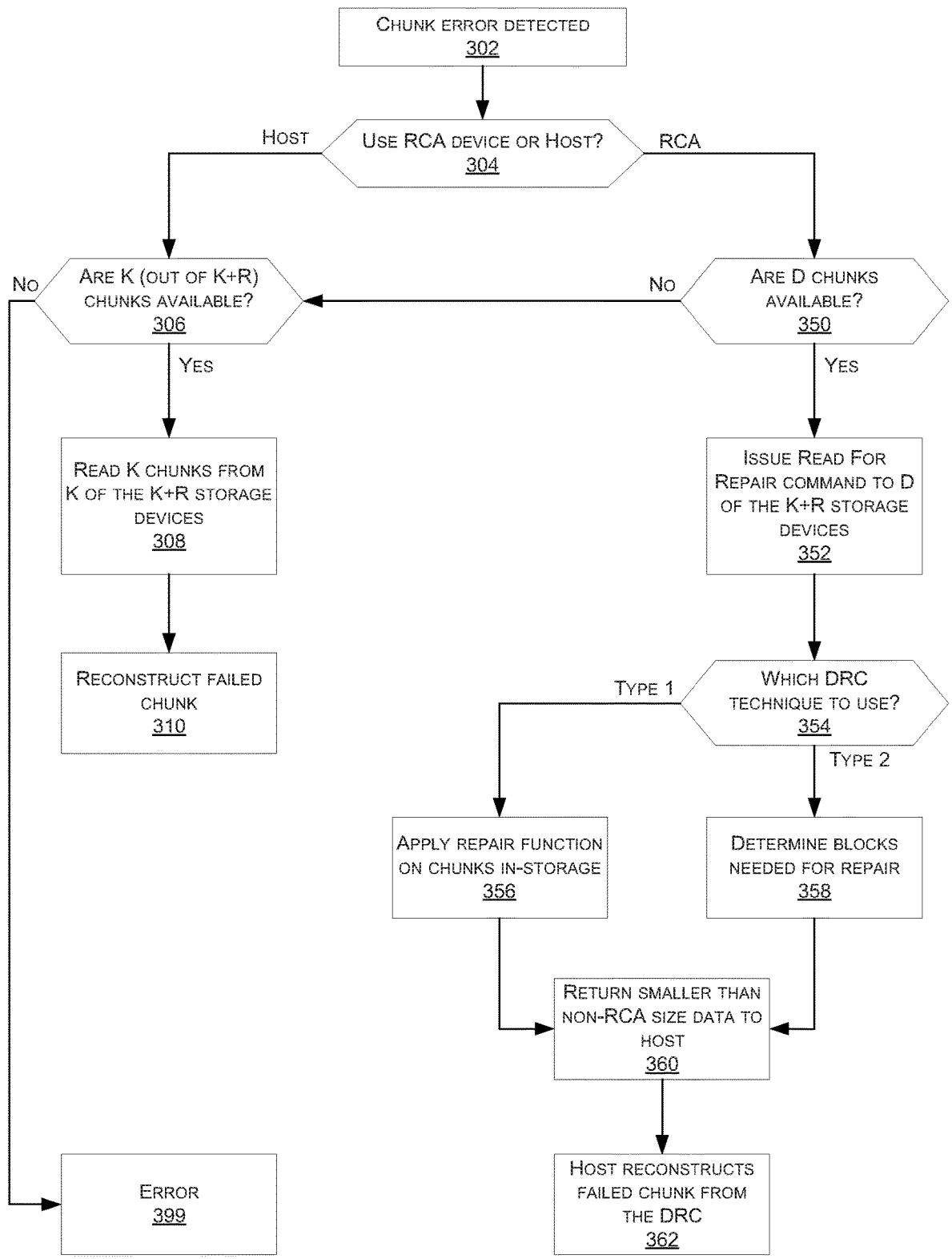
FIG. 3 is a flowchart of an example embodiment of a technique in accordance with the disclosed subject matter.

FIG. 3 is a flowchart of an example embodiment of a technique 300 in accordance with the disclosed subject matter. In various embodiments, the technique 300 may be used or produced by the systems such as those of FIGS. 1, 2A, 2B, 2C, and 2D. Although, it is understood that the above are merely a few illustrative examples to which the disclosed subject matter is not limited. It is understood that the disclosed subject matter is not limited to the ordering of or number of actions illustrated by technique 300.

In the illustrated embodiment, for the sake of simplicity, the technique 300 illustrates an example in which all the devices of the storage system are either RCA storage devices or non-RCA storage devices (i.e. a homogeneous storage system). For mixed or heterogeneous storage systems, one skilled in the art will understand how the simplified technique 300 may be expanded to apply on an individual storage device basis.

Block 302 illustrates that, in one embodiment, an error associated with a chunk of data may be detected. In various embodiments, one or more of the action(s) illustrated by this Block may be performed by the apparatuses or systems of FIG. 1, 2A, 2B, 2C, or 2D, as described above.

Block 304 illustrates that, in one embodiment, a determine may be made as to whether the data regeneration code (DRC) will be computed by the host device or by the respective RCA storage devices, as described above. In various embodiments, one or more of the action(s) illustrated by this Block may be performed by the apparatuses or systems of FIG. 1, 2A, 2B, 2C, or 2D, as described above.

Block 306 illustrates that, in one embodiment, if the RCD is to be computed by the host in a more traditional way, a determine may be made as to whether there is enough existing data to compute the RCD, as described above. In one such embodiment, this may include determining if K chunks are available out of the K+R data chunks. In various embodiments, one or more of the action(s) illustrated by this Block may be performed by the apparatuses or systems of FIG. 1, 2A, 2B, 2C, or 2D, as described above.

Block 399 illustrates that, in one embodiment, if not enough error-free chunks exist to compute the RCD that some other form of error handling, beyond the recreation of the errored chunk of data may occur. In various embodiments, this may simply be the reporting that data is corrupt or unavailable. In various embodiments, one or more of the action(s) illustrated by this Block may be performed by the apparatuses or systems of FIG. 1, 2A, 2B, 2C, or 2D, as described above.

Block 308 illustrates that, in one embodiment, the required number of chunks (e.g., K chunks) may be read from various (e.g., K+R) storage devices, as described above. In various embodiments, this may simply be the reporting that data is corrupt or unavailable. In various embodiments, one or more of the action(s) illustrated by this Block may be performed by the apparatuses or systems of FIG. 1, 2A, 2B, 2C, or 2D, as described above.

Block 310 illustrates that, in one embodiment, the host device may reconstruct or recreate the errored chunk using the error-free chunks (e.g., K chunks), as described above. In various embodiments, this may simply be the reporting that data is corrupt or unavailable. In various embodiments, one or more of the action(s) illustrated by this Block may be performed by the apparatuses or systems of FIG. 1, 2A, 2B, 2C, or 2D, as described above.

Block 350 illustrates that, in one embodiment, a determination may be made if there are enough error-free chunks (e.g., D chunks) to compute the DRC, as described above. If not, in various embodiments, the technique 300 may resort to attempting the non-RCA device path starting with Block 306. Otherwise, the technique 300 may continue to Block 352. In various embodiments, this may simply be the reporting that data is corrupt or unavailable. In various embodiments, one or more of the action(s) illustrated by this Block may be performed by the apparatuses or systems of FIG. 1, 2A, 2B, 2C, or 2D, as described above.

Block 352 illustrates that, in one embodiment, a read for repair command may be issued to the required number (e.g., D) of the total (e.g., K+R) storage devices, as described above. In various embodiments, one or more of the action(s) illustrated by this Block may be performed by the apparatuses or systems of FIG. 1, 2A, 2B, 2C, or 2D, as described above.

Block 354 illustrates that, in one embodiment, a determination may be made as to which of a plurality of versions or types of DRC techniques are to be used, as described above. In the illustrated embodiment, the versions or types of DRC techniques are generalized into the Type 1 and 2 techniques described above, but it is understood that these types are merely a few illustrative examples to which the disclosed subject matter is not limited, and furthermore within those broad types many sub-types may exist, as described above. In various embodiments, one or more of the action(s) illustrated by this Block may be performed by the apparatuses or systems of FIG. 1, 2A, 2B, 2C, or 2D, as described above.

Block 356 illustrates that, in one embodiment, if the Type 1 DRC technique is selected, the repair function may be applied to the chunks within the RCA storage device, as described above. In various embodiments, one or more of the action(s) illustrated by this Block may be performed by the apparatuses or systems of FIG. 1, 2A, 2B, 2C, or 2D, as described above.

Block 358 illustrates that, in one embodiment, if the Type 2 DRC technique is selected, the blocks (or other sub-portions such as packets) needed for repair may be calculated, as described above. In various embodiments, one or more of the action(s) illustrated by this Block may be performed by the apparatuses or systems of FIG. 1, 2A, 2B, 2C, or 2D, as described above.

Block 360 illustrates that, in one embodiment, once the DRC or the needed blocks are computed, the DRC or blocks may be transmitted to the host device, as described above. In various embodiments, this may include a smaller size of data or smaller number of messages than the non-RCA path, as described above. In various embodiments, one or more of the action(s) illustrated by this Block may be performed by the apparatuses or systems of FIG. 1, 2A, 2B, 2C, or 2D, as described above.

Block 362 illustrates that, in one embodiment, the host device may reconstruct or recreate the errored chunk using the DRC or returned blocks, as described above. In various embodiments, this may simply be the reporting that data is corrupt or unavailable. In various embodiments, one or more of the action(s) illustrated by this Block may be performed by the apparatuses or systems of FIG. 1, 2A, 2B, 2C, or 2D, as described above.

Figure 4:
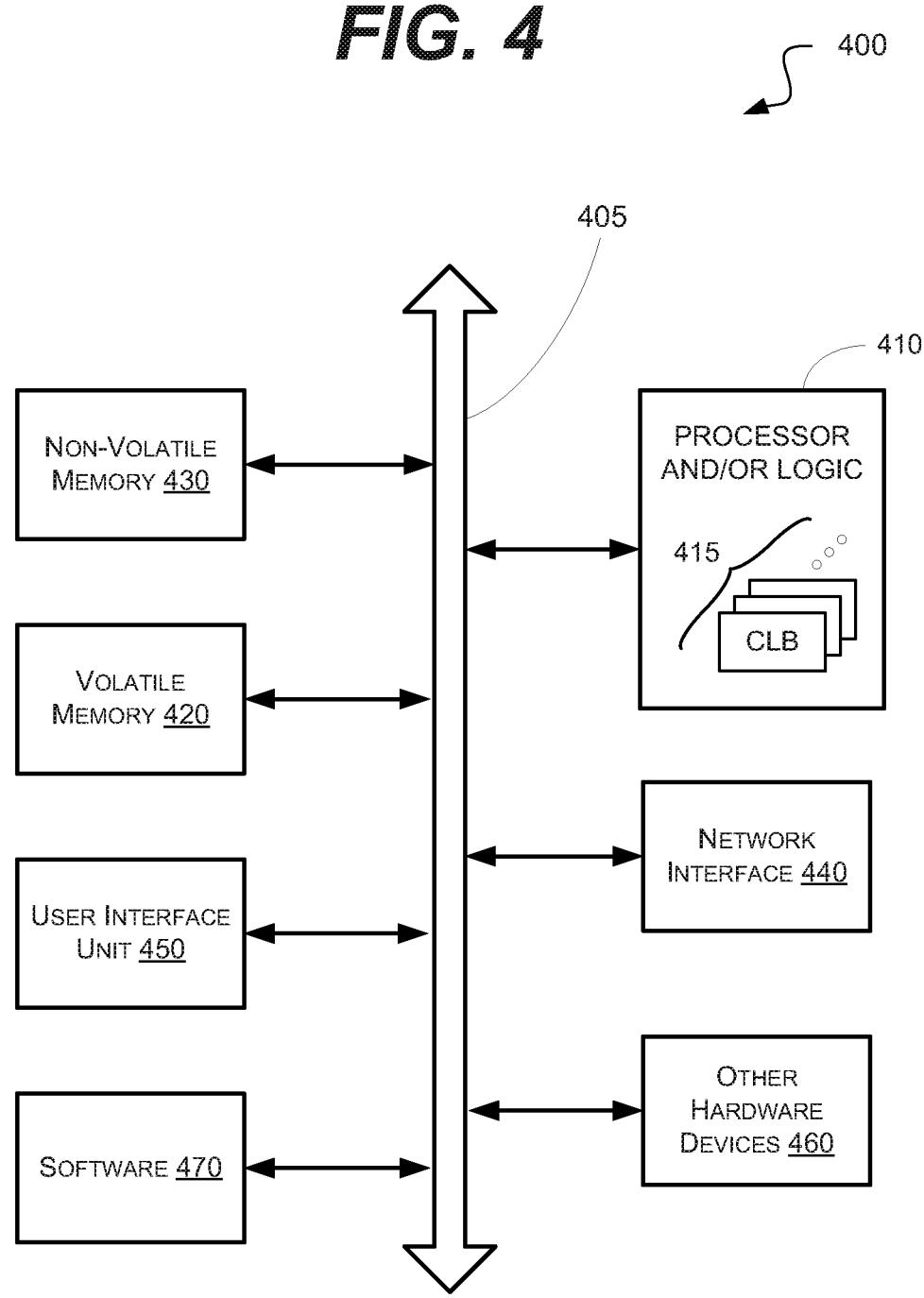
FIG. 4 is a schematic block diagram of an information processing system that may include devices formed according to principles of the disclosed subject matter.

FIG. 4 is a schematic block diagram of an information processing system 400, which may include semiconductor devices formed according to principles of the disclosed subject matter.

Referring to FIG. 4, an information processing system 400 may include one or more of devices constructed according to the principles of the disclosed subject matter. In another embodiment, the information processing system 400 may employ or execute one or more techniques according to the principles of the disclosed subject matter.

In various embodiments, the information processing system 400 may include a computing device, such as, for example, a laptop, desktop, workstation, server, blade server, personal digital assistant, smartphone, tablet, and other appropriate computers or a virtual machine or virtual computing device thereof. In various embodiments, the information processing system 400 may be used by a user (not shown).

The information processing system 400 according to the disclosed subject matter may further include a central processing unit (CPU), logic, or processor 410. In some embodiments, the processor 410 may include one or more functional unit blocks (FUBs) or combinational logic blocks (CLBs) 415. In such an embodiment, a combinational logic block may include various Boolean logic operations (e.g., NAND, NOR, NOT, XOR), stabilizing logic devices (e.g., flip-flops, latches), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 400 according to the disclosed subject matter may further include a volatile memory 420 (e.g., a Random Access Memory (RAM)). The information processing system 400 according to the disclosed subject matter may further include a non-volatile memory 430 (e.g., a hard drive, an optical memory, a NAND or Flash memory). In some embodiments, either the volatile memory 420, the non-volatile memory 430, or a combination or portions thereof may be referred to as a "storage medium". In various embodiments, the volatile memory 420 and/or the non-volatile memory 430 may be configured to store data in a semi-permanent or substantially permanent form.

In various embodiments, the information processing system 400 may include one or more network interfaces 440 configured to allow the information processing system 400 to be part of and communicate via a communications network. Examples of a Wi-Fi protocol may include, but are not limited to, Institute of Electrical and Electronics Engineers (IEEE) 802.11g, IEEE 802.11n. Examples of a cellular protocol may include, but are not limited to: IEEE 802.16m (a.k.a. Wireless-MAN (Metropolitan Area Network) Advanced, Long Term Evolution (LTE) Advanced, Enhanced Data rates for GSM (Global System for Mobile Communications) Evolution (EDGE), Evolved High-Speed Packet Access (HSPA+). Examples of a wired protocol may include, but are not limited to, IEEE 802.3 (a.k.a. Ethernet), Fibre Channel, Power Line communication (e.g., HomePlug, IEEE 1901). It is understood that the above are merely a few illustrative examples to which the disclosed subject matter is not limited.

The information processing system 400 according to the disclosed subject matter may further include a user interface unit 450 (e.g., a display adapter, a haptic interface, a human interface device). In various embodiments, this user interface unit 450 may be configured to either receive input from a user and/or provide output to a user. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

In various embodiments, the information processing system 400 may include one or more other devices or hardware components 460 (e.g., a display or monitor, a keyboard, a mouse, a camera, a fingerprint reader, a video processor). It is understood that the above are merely a few illustrative examples to which the disclosed subject matter is not limited.

The information processing system 400 according to the disclosed subject matter may further include one or more system buses 405. In such an embodiment, the system bus 405 may be configured to communicatively couple the processor 410, the volatile memory 420, the non-volatile memory 430, the network interface 440, the user interface unit 450, and one or more hardware components 460. Data processed by the processor 410 or data inputted from outside of the non-volatile memory 430 may be stored in either the non-volatile memory 430 or the volatile memory 420.

In various embodiments, the information processing system 400 may include or execute one or more software components 470. In some embodiments, the software components 470 may include an operating system (OS) and/or an application. In some embodiments, the OS may be configured to provide one or more services to an application and manage or act as an intermediary between the application and the various hardware components (e.g., the processor 410, a network interface 440) of the information processing system 400. In such an embodiment, the information processing system 400 may include one or more native applications, which may be installed locally (e.g., within the non-volatile memory 430) and configured to be executed directly by the processor 410 and directly interact with the OS. In such an embodiment, the native applications may include pre-compiled machine executable code. In some embodiments, the native applications may include a script interpreter (e.g., C shell (csh), AppleScript, AutoHotkey) or a virtual execution machine (VM) (e.g., the Java Virtual Machine, the Microsoft Common Language Runtime) that are configured to translate source or object code into executable code which is then executed by the processor 410.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
 a storage device comprising:
  a memory configured to store a data chunk comprising a first data block and a second data block, wherein the first data block comprises a first portion of a data set and the second data block comprises a second portion of the data set;
  a circuit configured to compute, based on at least one request, information to build at least a portion of the data set; and
  at least one interface configured to:
   receive the at least one request; and
   transmit the information to build the at least the portion of the data set.

2. The apparatus of claim 1, wherein the circuit is configured to compute, using the first data block and the second data block, the information to build the at least the portion of the data set.

3. The apparatus of claim 2, wherein the information to build the at least the portion of the data set comprises a generation code.

4. The apparatus of claim 1, wherein:
 the at least one request comprises an indication of a third data block; and
 the circuit is configured to compute, based on the indication of the third data block, the information to build the at least the portion of the data set.

5. The apparatus of claim 4, wherein the indication of the third data block comprises the third data block.

6. The apparatus of claim 4, wherein the information to build the at least the portion of the data set comprises the first data block.

7. The apparatus of claim 1, wherein the circuit is configured to compute, using an algorithm, the information to build the at least the portion of the data set.

8. The apparatus of claim 7, wherein the storage device is configured to select the algorithm based on the at least one request.

9. A system comprising:
 a device configured to:
  store, at one or more storage devices, at least one chunk of data, wherein the at least one chunk of data comprises a first portion of a data set;
  detect a condition associated with one of the at least one chunk of data;
  receive, from the one or more storage devices, information, wherein the information comprises information to build at least a portion of the data set; and
  build, based on the condition, using the information, the at least the portion of the data set;
 wherein one of the one or more storage devices is configured to:
  compute, based on the at least one chunk of data, the information; and
  transmit the information to the device.

10. The system of claim 9, wherein the condition is based on a validity status.

11. The system of claim 9, wherein:
 the device is configured to send a request to the one of the one or more storage devices; and
 the one of the one or more storage devices is configured to compute, based on the request, based on the at least one chunk of data, the information.

12. The system of claim 11, wherein:
 the request comprises an indication of the first portion of the data set; and
 the information comprises a generation code.

13. The system of claim 11, wherein:
 the request comprises an indication of a second portion of the data set; and
 the information comprises the first portion of the data set.

14. The system of claim 11, wherein the device is configured to determine the request based on a performance parameter associated with the one of the one or more storage devices.

15. The system of claim 11, wherein the device is configured to:
 determine a capability, to compute the information, of the one of the one or more storage devices; and
 determine the request based on the capability.

16. The system of claim 15, wherein the request comprises an indication of an algorithm to compute the information.

17. An apparatus comprising:
 a storage device comprising at least one circuit configured to:
  receive a data chunk comprising a first data block and a second data block, wherein the first data block comprises a first portion of a data set and the second data block comprises a second portion of the data set;

receive at least one request, wherein the at least one request comprises a request to perform a computation; and send, based on the request to perform the computation, information to build at least a portion of the data set.

18. The apparatus of claim 17, wherein the information to build the at least the portion of the data set comprises a code based on the first data block and the second data block.

19. The apparatus of claim 17, wherein:

the at least one request comprises an indication of a third data block; and the information to build the at least the portion of the data set comprises the first data block.

20. The apparatus of claim 19, wherein the indication of the third data block comprises the third data block.

* * * * *